OR 3,627,402

SEARCH ROOM

[11] 3,627,402

[72] Inventor Rodger L. Gamblin
Pound Ridge, N.Y.

[21] Appl. No. 863,479
[22] Filed Oct. 3, 1969
[45] Patented Dec. 14, 1971
[73] Assignee International Business Machines Corporation
Armonk, N.Y.

[54] HIGH-CAPACITY HOLOGRAPHIC MEMORY
5 Claims, 8 Drawing Figs.

[52] U.S. Cl. .......... 350/3.5, 350/162 SF
[51] Int. Cl. .......... G02b 27/22
[50] Field of Search .......... 350/3.5

[56] References Cited

UNITED STATES PATENTS 3,511,553 5/1970 Gerritsen et al. .......... 350/3.5

OTHER REFERENCES

Vitols, IBM Tech. Disc. Bulletin, Vol. 8, No. 11, pp. 1581–83 (4/1966)

Smits et al., Bell System Tech. Journal, pp. 1267–1278, (7/1967)

*Primary Examiner*—David Schonberg
*Assistant Examiner*—Robert L. Sherman
*Attorneys*—Hanifin and Jancin and Andrew Taras

ABSTRACT: System capacity in a holographic memory is maximized by a reduction in spatial frequencies by reducing the angle of incidence of the reference and object beams during construction and eliminating the effects of the cross correlation image by minimizing the angle of incidence of the readout beam relative to different holograms in the holoarray, this being achieved by bringing all readout beams to an area of convergence spaced from the system optical axis and the readout-detecting means. To obtain maximum capacity for a given geometrical arrangement between the holoarray and the diode readout array, parameters such as number of holograms per holoarray, size and number of readout diodes in the diode array, can be maximized in order to be within the capabilities of the film resolution on which the holograms are constructed.

INVENTOR
RODGER L. GAMBLIN

BY *[signature]*
AGENT

HIGH-CAPACITY HOLOGRAPHIC MEMORY

BACKGROUND OF THE INVENTION

The invention relates to holographic memories and more particularly to beam orientation in the construction and reconstruction of holographic images.

The prior art, consisting primarily of publications, provides rather extensive treatment of image construction and reconstruction in the storage of digital information. For example, an IBM Technical Disclosure Bulletin, No. 8, by V. A. Vitols, dated Apr. 1966, page 1581, discloses a hologram memory for storing digital data. Design considerations for a semipermanent optical memory are disclosed in a Bell System Technical Journal by F. M. Smits et al., dated July 1967. A high-capacity, semipermanent optical memory is disclosed in the IEEE Journal on Quantum Electronics, dated July 1967, by L. K. Anderson et al.

In spite of this treatment in the above prior art publications there is, however, no consideration for the maximization of the storage capacity of a holographic memory system.

In particular the capacity of such a store, that is, its ability to store information, is a function of the wavelength of light used, the resolution capabilities of the photographic plates involved, the areas of the holographic array and the photodetection array, and the geometrical arrangement of these arrays.

OBJECTS

The principal object of the invention is to provide a holographic memory system in which maximum storage efficiency is realized to provide a lower cost per unit of stored information than is capable by prior art memory systems.

Another object is to reduce the spatial frequencies during construction of the holoarray so that maximum storage efficiency can be achieved for a film of given resolution.

Yet another object is to reduce the angle formed between the reference beam and a line extending between the most remote hologram and diode in their respective arrays.

A further object is to maintain at a minimum the angle between the zero and first orders of a reference beam of maximum angular incidence.

A still further object is to maximize storage capacity by bringing all readout beams to an area of convergence spaced from the optical axis of the system and the detecting means.

The foregoing and other objects, features and advantages of the invention will be apparent from the following more particular description of preferred embodiments of the invention, as illustrated in the accompanying drawings.

The method of holographic image construction is generally well known in the art. The hologram, during construction, is formed by recording the interference pattern between two coherent beams of light, a reference beam and an object beam, on a photographic plate. The interference pattern is the result of interaction between the object and reference beams. On reconstruction, if either of the two beams is used to illuminate the hologram, the contents of the second beam will be reconstructed. For storage purposes a holoarray is constructed consisting of a plurality of individual holograms each containing, in the case of data storage, a unique coded pattern of dots representing coded information.

Figures 1, 2A, 2B, 3A, 3B:
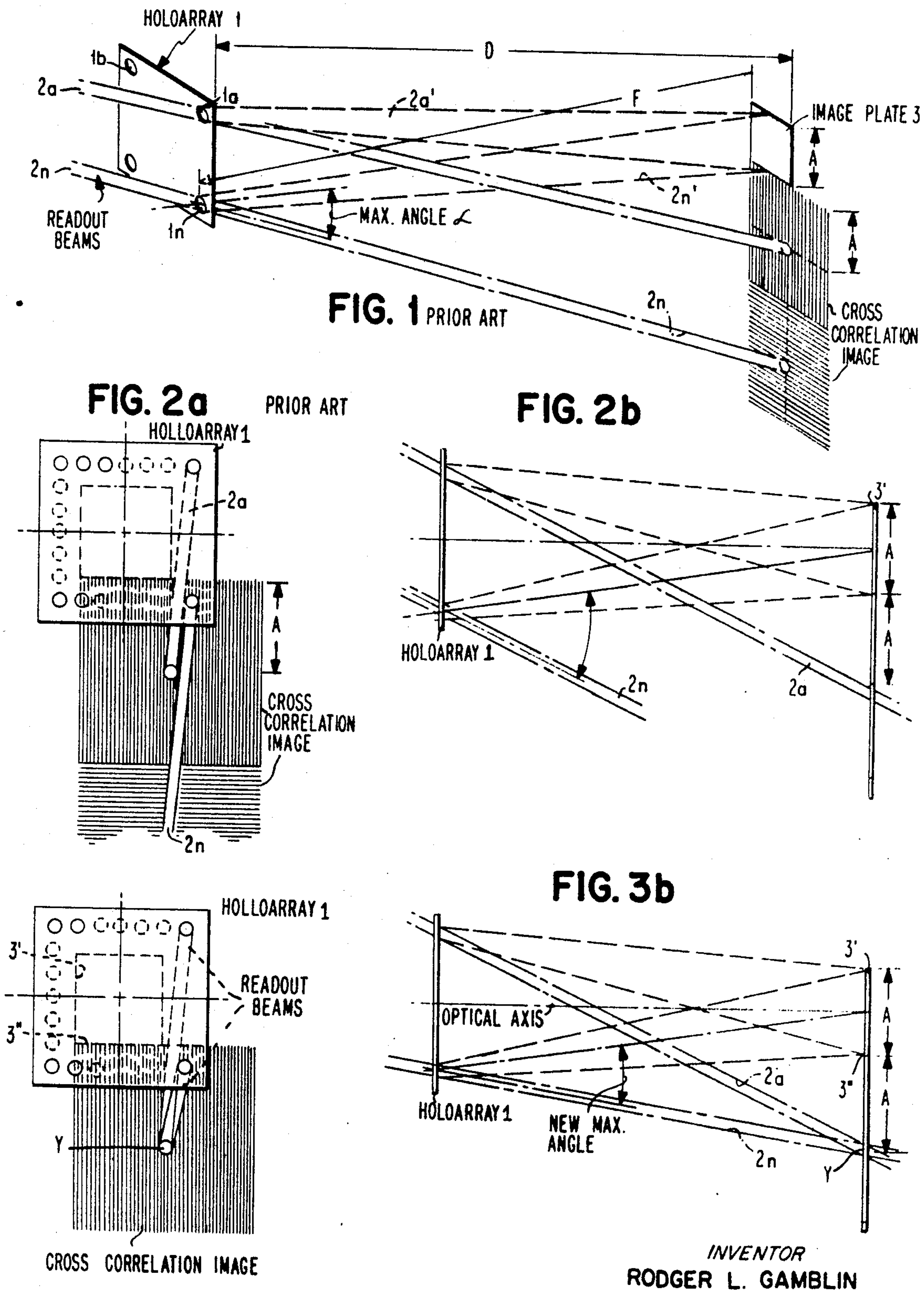
FIG. 1 shows a prior art technique for readout from a holoarray and emphasizing in particular, the orientation of the reference readout beam.
FIGS. 2*a* and 2*b* show prior art techniques employing parallel reference beams for reading out information from a holoarray.
FIG. 3*a* is a side view, of the arrangement in FIG. 3*b*, showing the relationship of the cross correlation image to the point of convergence of all readout beams.
FIG. 3*b* shows an arrangement for minimizing spatial frequencies by converging the reference readout beams to a common point.

As seen in FIG. 1, a representative few holograms 1*a*–1*n* are shown on the holoarray 1. Image reconstruction is demonstrated by passing reference beams 2*a*, 2*n* through individual holograms 1*a*, 1*n*, the beams being oriented in parallel relative to each other and at an angle with respect to the plane of the holoarray 1. The information stored in the hologram 1*a* is imaged at an image plate 3 under control of reference beam 2*a* which, upon emerging from the holoarray 1, is diffracted to form a beam 2*a*′ which forms a unique pattern of coded dots at the plane of the image plate 3. The information stored in the hologram 1*n* is similarly imaged at the plate 3 and, on emerging from the holoarray 1, is diffracted to form a diffracted beam 2*n*′ which forms a maximum angle $\alpha$ (alpha) with the reference beam 2*n*.

The image plate 3, in a holographic store, generally assumes the form of an image detection means, for example, a diode readout array containing a diode for each possible coded spot projected from any of the holograms in the holoarray, and in accordance with the techniques of the prior art the diode array is spaced a distance D from the holoarray. From an inspection of FIG. 1 it may be appreciated that the distance F between the most remote hologram and the most remote diode represents the maximum distance between the two arrays. From a consideration of the geometrical arrangement, it is seen that the angle $\alpha$ is the maximum angle between the most remote readout beam and the most remote diode in the diode array and is considered greater than any other angle in the geometrical arrangement of FIG. 1.

It has been experimentally demonstrated that as these extreme angles in a store having the geometrical arrangement of FIG. 1 increase, the spatial frequencies in the recorded diffraction pattern of the hologram also increase. Thus in the construction of the initial hologram, if the angle between the reference and object beams is wide, the readout beam with respect to the diffracted beam will also have a wide angle. Accordingly, it follows that the variations in the intensity patterns in the recorded hologram yield greater spatial frequencies than would be the case were the angles made smaller in the construction process. A solution advanced by prior art techniques to the above problem was to increase the separation, distance D, in the arrays in FIG. 1. This, up to a certain point, was not too desirable since a given sized hologram would necessarily require projection of the image over a longer distance and thus result in the projection of a larger image spot size. This led to the necessity of increasing the size of the diodes in the diode array and as such led to a decrease in the capacity of the memory since the capacity is a direct function of the number of the diodes in the array times the number of holograms in the store. It is thus seen that a reduction in the number of diodes for a given area leads to a reduction in the capacity of the memory.

The spatial orientation of the different readout beams may further be viewed from elevation views represented by FIGS. 2*a* and 2*b* from which it is shown that a given separation must be maintained between the readout beam and the diode array along an imaginary line passing vertically through the diode array. This separation is represented by the distance A which is equivalent to the vertical dimension of the array 3′. This separation is necessary to prevent interference between unwanted frequencies, known as the cross correlation image factor, surrounding the readout beams. Since the cross correlation factor surrounds all such readout beams and since the beam 2*n* is parallelly oriented with respect to the other beams, it is understandable that the cross correlation factor becomes a significant parameter in the determination of the size of the angle α in the geometrical arrangements of FIGS. 1 and 2. Because of the variations in the different angles brought about by the different parallel readout beams, it has been found that variations in impinging intensities on the various diodes in the diode array 3' are extremely wide and under some conditions of operations the signal to noise ratio has been found to be so low as to cause improper readout between signal and no signal conditions.

Most of the systems contemplated for the recording of holographic patterns for a memory envision the interplay of a reference beam at the hologram with an object beam derived from a bit mask that represents the image to be displayed subsequently. This particular method of image construction allows each bit in the object pattern to act as a reference beam for every other bit during the recording process. As a result, on reconstruction, the cross correlation image is found around the zero order reference beam transmitted through the hologram. This latter image is physically twice as large as the image to be stored and the first order image must be arranged to avoid this unwanted image in order to prevent noise at locations where no bit is to be found upon readout. Thus as shown in FIG. 1, the arrangement of the readout for a holographic scheme must be such as to prevent overlap of the cross correlation image with the stored images. In the figure, the zero order readout beams emerging from the hologram plate give rise to an area of cross correlation image as shown in the shaded portion around the area reserved for transmission of the zero order beams. The image pattern must be displaced beyond this cross correlation area and as a result the angle between the extreme bit and hologram is relatively large as shown in the figure.

Figure 4:
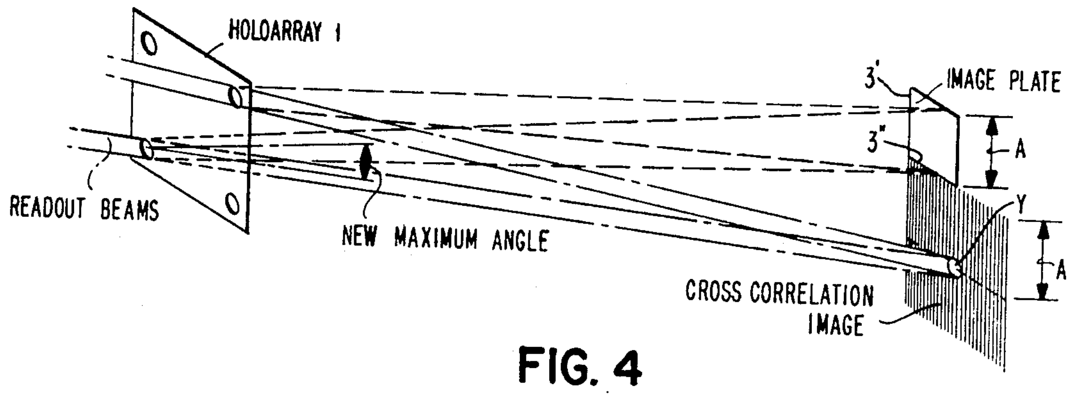
FIG. 4 is an isometric view showing orientation of the readout beam in accordance with the teachings of the invention.

The arrangement in FIGS. 3a, 3b and 4 overcome all the deficiencies of the prior art stores by bringing to a minimum the angle α for the worst condition specified in the arrangement of FIGS. 1 and 2. In FIG. 3b it is seen that the arrays 1 and 3' are disposed in parallel spaced relation and the optical axis passes through the centers of said arrays. From an inspection of FIG. 3b it can be appreciated that all readout beams are brought to convergence at a common area Y, equivalent to the beam's cross-sectional area, located below the optical axis and lying on a dotted line extending vertically from the diode array 3' and spaced from the bottom edge 3'' of the array 3' a distance A which is sufficient to avoid the effects of all cross correlation image factors surrounding all readout beams. By virtue of the reorientation of all readout beams in this manner the worst case angle α condition is considerably reduced.

The primary limitations to the capacity of such a holographic store are determined by the numbers of resolvable lines per millimeter which may be recorded on the hologram plate and the size of diodes which may be placed in the total area of the image plate. For a given distance between the hologram and image planes and size and shape of these two planes (i.e., a given geometry) the worst case spatial frequency (or lines per millimeter on the hologram) is fixed. In addition, the size of a diode determines the number of diodes which can be placed in the image plane and the size of the hologram determines the number of holograms which can be placed in the hologram plate. The total system capacity is defined by number of diodes $m$ times the number of holograms $n$. Since $n$ is proportional to $(l/d'^2)$ where $d'$ is the diameter of a diode and $m$ is proportional to $(l/d^2)$ where $d$ is the size of a hologram we have:

$$C=mn=k(l/d^2d'^2)$$

wherein C is the system capacity. The relationship between $d'$ and $d$ arises from physical optics and is $d=k/d'$ so that for a given geometrical arrangement $$C=k/k=\text{a constant}$$

Thus it can be appreciated that for a given geometry the system capacity is fixed irrespective of the relative size of diodes and holograms.

In order to arrive at an optimal system capacity, an analysis of the system shown in FIG. 1 has been performed with the following parameters and values:

System capacity, C,-79593472
Light wavelength, ZLAMDA=0.6328A.
Hologram size, D,=0.130 cm.
Distance between planes, F, 23.2 cm.
Diode size, DELT, =0.025 cm.
Hologram plate size, CAPD, =10 cm. ×10 cm.
Diode plate size, E, G,=6.97×6.97 cm.

The worst case spatial frequency computed at 1310 lines per millimeter was found to be excessive for most GaAs of hologram construction. In accordance with the invention, the maximum spatial frequency was reduced to a frequency of 862 lines per millimeter. This reduction in spatial frequency enables an increase in system capacity by a factor greater than two.

Figure 5:
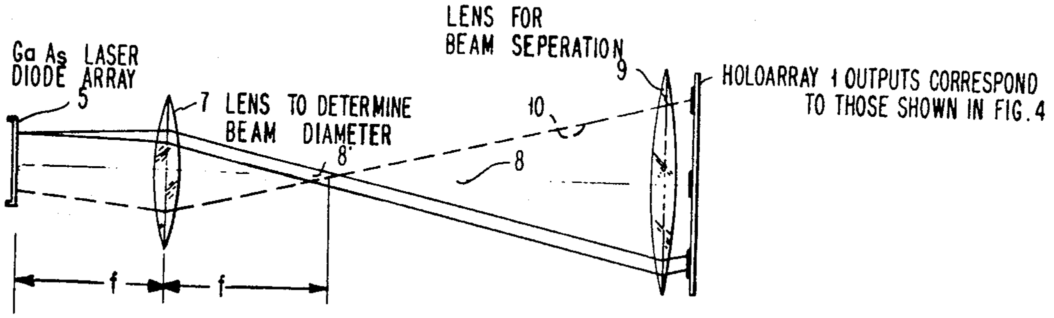
FIG. 5 is a detailed arrangement showing the use of lenses, among other things, to provide different beam orientations for the readout beam.

Implementation of the invention is achieved by means of the beam-directing arrangement shown in FIG. 5 which utilizes GaAs gas laser diode array as the source from which different spatially oriented beams are issued and directed through an optical system comprised of a lens 7, lens 9 and the holoarray 1. The lens 7 determines the beam diameter and is displaced from the array 5 by one focal length *f*. The different beams issuing from the source 5 intercept the optical axis at a common point 8' on the optical axis 8 and are directed through the second lens 9 and through the different holograms in the holoarray 1. The zero orders of all beams emerging from the hologram are brought to a converging area Y, displaced from the optical axis 8, as further seen in FIGS. 3a, 3b and 4.

Figure 6:
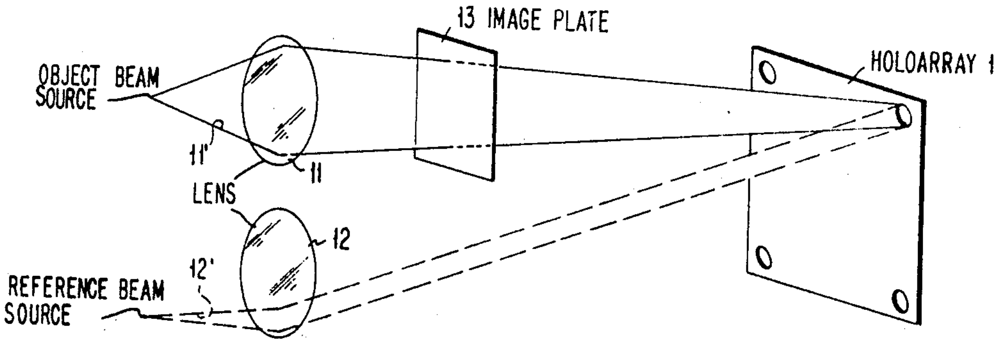
FIG. 6 shows a hologram construction technique to provide the holoarray used in the practice of the invention.

The holoarray utilized in the practice of the invention is constructed by means of the arrangement shown in FIG. 6. This arrangement comprises essentially a pair of lenses 11, 12 through which object and reference beams respectively 11' and 12' are directed and brought to interact at a discrete area whereat an interference pattern is formed and developed to form the hologram. An image plate 13 which is a pattern of coded dots representing a unique pattern of information, is interposed in the path of the beam 11' and for each different hologram a different pattern of information is employed in the image plate 13.

For each hologram constructed on the holoarray, the beams must have a unique spatial orientation. Accordingly, the source for each of the beams may be oriented by any conventional optical system well known in the art, utilizing a common laser source such as a scan laser for a plurality of different spatially oriented output beams. By means of this optical system both the object and reference beams 11' and 12' assume spatial orientations unique for each hologram developed in the holoarray.

As an alternative, it is also possible to construct holograms by a process that avoids the cross correlation termed by exposing bits sequentially in the construction process or by recording the requisite wave patterns derived by special computational procedures. By virtue of these construction techniques the spatial frequencies can be reduced to a value which is within the capabilities of the film resolution and provide maximum storage capacity to be realized in the reconstruction process by utilizing the maximum number of holograms per holoarray and a corresponding maximum in the number of diodes in the readout-detecting means for a given geometrical store arrangement.

While the invention has been particularly shown and described with reference to preferred embodiments thereof, it will be understood by those skilled in the art that the foregoing and other changes in form and details may be made therein.

I claim:

1. A holographic store system comprising:
a holoarray constituted of a plurality of spaced-apart holograms,
image-detecting means disposed in parallel spaced relation to said holoarray and adapted to receive first order images projected from the holograms in said holoarray, said means and holoarray having their respective centers lying on the optical axis of the system, and
beam-directing means for directing a plurality of unique beam orientations through said holoarray such that each zero order emerging from said holoarray is directed at a common area, as said first order images are projected on said image-detecting means, said common area being equivalent to the beam's cross-sectional area and lying in a plane of said image-detecting means, said common area being further displaced from the optical axis a distance sufficient to eliminate the effects of the cross correlation image, surrounding the zero order of each beam orientation, from said image-detecting means.

2. The system as in claim 1 in which said holograms constitute each an interference pattern representing a unique pattern of coded bits of information, said detecting means comprising an array of photodiodes each responsive to a specific code bit.

3. The system as in claim 2 in which said holoarray is constituted of a film of given resolution.

4. The system as in claim 2 in which the maximum angle $\alpha$ between the zero and first orders of a readout beam having the greatest angle of incidence relative to said holoarray is such that the resulting spatial frequencies do not exceed the given resolution capabilities of said film.

5. The system as in claim 1 in which said beam directing means comprises a laser source providing a plurality of different spatially oriented readout beams and an optical system through which said readout beams are directed, said optical system including first and second lenses respectively providing beam size and direction for said plurality of unique beam orientations.

* * * * *